United States Patent Office 2,880,170
Patented Mar. 31, 1959

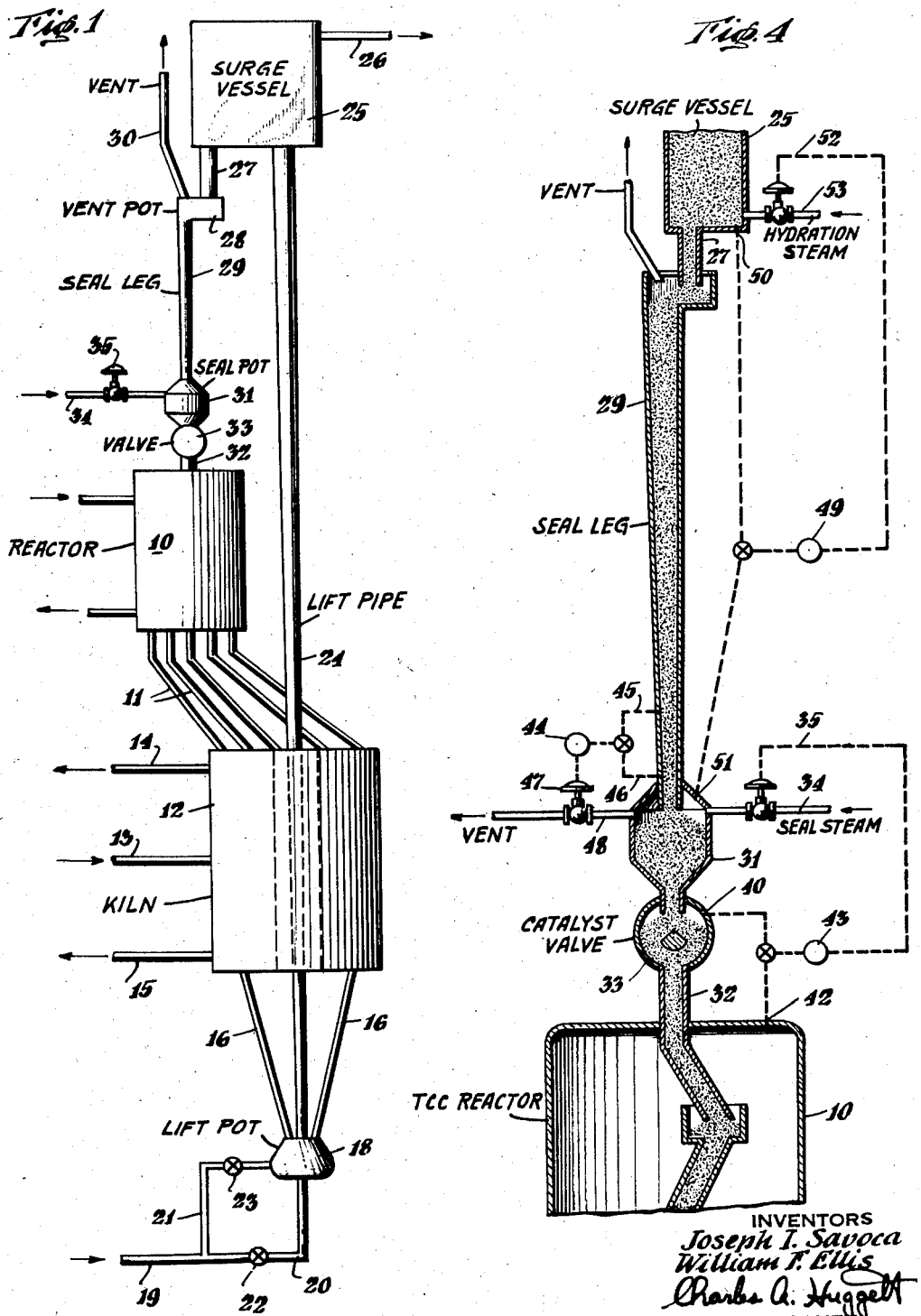

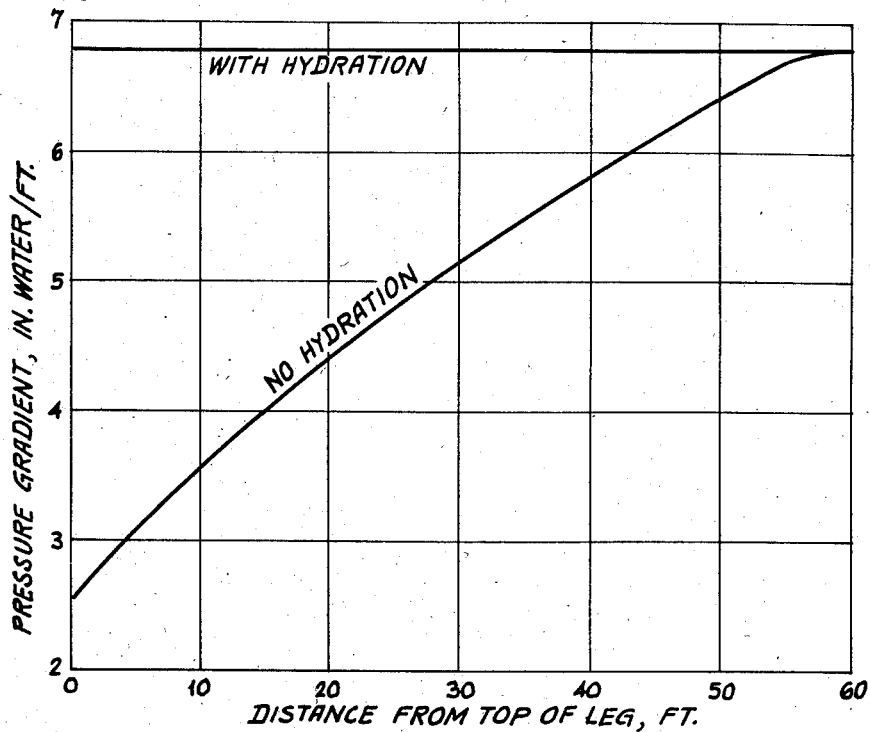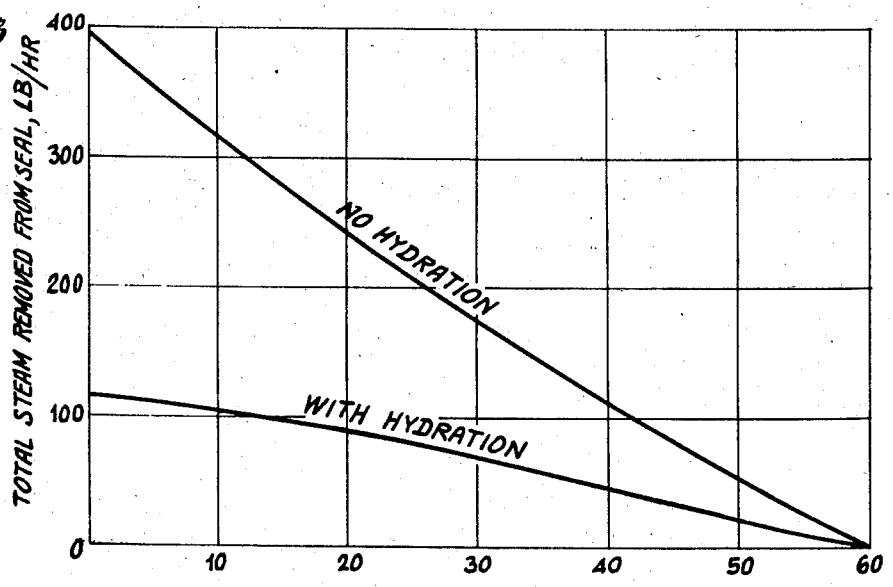

2,880,170

METHOD OF SEALING MOVING BED CONVERSION REACTOR

Joseph I. Savoca, Haddonfield, N.J., and William F. Ellis, Beaumont, Tex., assignors to Socony Mobil Oil Company, Inc., New York, N.Y., a corporation of New York Application December 13, 1956, Serial No. 628,120

3 Claims. (Cl. 208—173)

This application relates to an improvement in the moving bed process for the contacting of hydrocarbons with a contact material to provide rearrangement of said hydrocarbons. The invention more specifically pertains to the feeding of granular contact material continuously as a gravitating compact stream into a moving bed reaction vessel against advanced pressure in the vessel.

The TCC process has been used for a considerable period of time now to provide increased quantities of high octane fuel for use as motor fuel and to provide motor fuel of improved qualities. In this process a granular cracking catalyst is passed downwardly as a substantially compact gravitating bed through a reaction vessel where it is contacted with hydrocarbons in vapor or liquid-vapor form under suitable reaction conditions to effect conversion or rearrangement of substantial portions of the hydrocarbons to provide the improved products. During the conversion the catalyst becomes contaminated and may suffer a loss in temperature. The spent catalyst is withdrawn from the bottom of the bed at a sufficient rate, therefore, to keep the reaction conditions within the reaction zone at a suitably desired high level.

The spent catalyst withdrawn from the reaction vessel is introduced into the top of a regeneration vessel or kiln and passed downwardly therethrough as a compact gravitating bed. Within the kiln the spent catalyst is contacted with air or other suitable oxygen-containing gas and the carbonaceous contaminant is burned under controlled conditions to effect a substantial removal of the contaminant and to render the catalyst in a form suitable for re-use in the process. The regenerated catalyst is passed through a suitable cooler either within the regeneration zone or outside of the zone where the temperature is corrected to that temperature desired for re-use in the reaction vessel.

It has been found most desirable to regenerate the catalyst at substantially atmospheric pressure whereas, it is necessary to maintain an advanced pressure in the reaction zone. This pressure may be in the neighborhood of 10 to 15 pounds per square inch gauge. Extensive experimentation and practical application in the past has shown that various types of valves or mechanical feeding means are not suitable for use in gravitating compact catalyst and must be avoided. In order to feed the catalyst into the reaction vessel smoothly against the advanced pressure therein, a gravity feed leg was developed which comprises in simplified form an elongated passageway of restricted cross-section located above the reaction vessel through which the particles were gravitated and the pressure on the catalyst built up slowly. When the feed leg was properly designed and of sufficient length, it was found that the catalyst would feed smoothly into the high pressure reaction vessel and that by using a suitable seal gas introduced into the seal leg near the bottom thereof, the catalyst could continuously enter the reaction vessel without having reaction vapors escape from the vessel through the open feed leg.

The catalyst used in this process has been either a natural or treated clay of granular form or, alternatively, a synthetic gel-type material, such as silica and alumina, silica and molybdena, etc. The particles are preferably in a size range of about 4–12 mesh Tyler, although other sizes of granular material can be used.

Since steam is the cheapest and most readily available gas for use as a seal medium, it has generally been used. There is a problem in connection with the use of steam, however, since the catalyst is generally desorbed in the regenerator and when brought in contact with steam, will adsorb a substantial amount of the vapor. It has been found that when the catalyst is brought into contact with an excessive amount of steam, however, that the catalyst loses its catalytic activity and, hence, tends to convert less and less of the vapors to high quality gasoline products. Hence, excessive contamination of catalyst with steam must be avoided. The substitution of flue gas for the steam as a sealing medium has been considered and even tested in some instances. However, it was not adopted for the reason that (1) steam is cheap and readily available, (2) the portion of the seal steam entering the reactor is easily separated from the reaction product vapors by condensation whereas, flue gas would have to be recovered in a separate gas plant, thereby requiring additional apparatus and (3) steam minimizes metal poisoning by reducing the effect of nickel on catalyst activity decline. It has been found that hydrocarbon charge containing even small amounts of metal nickel have a deleterious effect upon the catalyst causing an unusually rapid decrease of its activity and ability to convert hydrocarbons to high quality gasoline products. It has also been found that if the catalyst is substantially completely saturated when it enters the reaction zone, the effect of the nickel is less harmful on catalyst activity.

The general arrangement for feeding the catalyst through the seal leg is to introduce the catalyst at substantially atmospheric pressure into a hopper above the reaction vessel to form a compact gravitating bed therein. Catalyst is then withdrawn from the bottom of the hopper through the elongated seal leg of restricted cross-section down a substantial distance to a seal pot. Steam is introduced into the seal pot to enter the gravitating catalyst column with some of the steam passing upwardly through the column. The catalyst is gravitated from the bottom of the seal pot through a short leg into the top of the reaction vessel. In some instances in this leg is located an emergency shut-off valve which, during normal operation, is in the open position but which, under emergency conditions, can be closed to seal off the seal leg passage. The seal steam introduced into the seal pot is introduced in sufficient amount to maintain the pressure in the seal pot just slightly above the pressure in the reaction vessel. Therefore, a small amount of the seal steam travels downwardly with the catalyst through the short leg to enter the top of the reaction vessel. While the reactor has been operated in the past in the TCC system at about 10 to 15 pounds per square inch gauge, it is frequently desirable to operate at a higher pressure up to as much as 18–22 pounds per square inch gauge. However, this has been impossible in the past because of the shortness of the seal leg. It has been found that a seal leg designed to feed catalyst into a reactor at 10–15 pounds would not flow catalyst when the pressure in the reactor was advanced even a few pounds above this. The catalyst was held up in the leg and the continuous system failed to operate.

The object of this invention is to provide an improvement in the TCC system which would permit the catalyst to feed through the seal leg system without interruption against a variable reaction pressure.

A further object of this invention is to provide an improved method of sealing a gravity feed or seal leg in a TCC system which would permit the reactor pressure to be raised and yet, still provide continuous smooth flow of the catalyst through the seal system. These and other objects will be obvious from the following detailed discussion.

One aspect of this invention involves in a moving bed hydrocarbon conversion system the supplying of granular catalyst to a surge zone located substantially above a reaction zone to form a compact mass in said zone followed by gravitating the catalyst downwardly from the bottom of said surge zone through a substantially elongated passage of restricted cross-section as a compact column to a seal zone located about the bottom of the elongated column and then passing the catalyst downwardly as a compact column through a short connecting passage into the top of the reaction zone maintained under a substantially higher pressure than that maintained in the surge zone, while feeding continuously to the seal zone a controlled amount of steam, the amount being adjusted to maintain a pressure differential between a point intermediate the seal zone and the top of the reaction zone and a point at the top of the reaction zone substantially constant, simultaneously measuring the pressure drop across a short vertical section of the seal leg near the bottom thereof and venting from the seal zone enough steam to prevent this pressure differential from exceeding a predetermined maximum and further, introducing steam into the surge zone at the top of the seal column to hydrate the granular catalyst and controlling the flow rate of this steam introduced into the surge zone so as to maintain the pressure differential between the seal zone and the surge zone at a substantially constant value, equal to that required to maintain the seal zone pressure somewhat above the reaction zone pressure as required for sealing purposes.

Figure 1 discloses a complete moving bed hydrocarbon conversion system in which the invention is incorporated;

Figure 2 is a curve showing the effect of hydration on the pressure gradient at various levels in a 60 foot seal leg in the case where the catalyst is not hydrated when introduced into the top of the seal leg and in the case when the catalyst is fully hydrated when introduced into the top of the seal conduit;

Figure 3 is a curve illustrating the effect upon hydrating the catalyst before introducing it into the seal leg upon the amount of seal steam which is adsorbed by catalyst in a 60 foot seal leg in a TCC system;

Figure 4 illustrates diagrammatically the use of control apparatus to provide sufficient hydration steam to the catalyst as it is passed down through the seal leg to permit the seal leg to continue to supply catalyst to the reactor under variable pressures.

Referring to Figure 1, the spent catalyst is withdrawn continuously from the bottom of a reactor 10 through the conduits 11 and introduced into the top of the kiln 12. The catalyst is passed downwardly through the kiln as a compact gravitating mass. Air is introduced through the conduit 13 into the center of the mass in the kiln 12. A portion of the air passes upwardly to burn contaminant from the catalyst, being withdrawn as flue gas from the top of the kiln through conduit 14. The remaining portion of the air introduced through the conduit 13 passes downwardly concurrently with the catalyst to burn the remaining contaminants from the catalyst and is withdrawn from the bottom of the kiln through the conduit 15. The pressure maintained in the kiln may be in the neighborhood of 0 to 1 pound per square inch gauge. The regenerated catalyst is withdrawn from the bottom of the kiln through the conduits 16 as compact columns and introduced into a lift pot 18. A lift gas is passed through the conduit 19 and split into a primary stream 20 and secondary stream 21 before being introduced into the lift pot. These streams are controlled by the primary control valve 22 and secondary control valve 23 to effectively introduce the catalyst in the lift pot 18 into the combined streams of primary and secondary gas so that the particles are dispersed and travel upwardly through the lift pipe 24 with the rapidly rising stream of gas. The particles discharge from the top of the lift pipe in the surge vessel 25 in the form of a fountain and fall downwardly to the bottom of the vessel, the lift gas being withdrawn from the top of the vessel through the conduit 26. The bottom of the vessel 25 serves as a surge zone allowing for a substantial change in volume in the mass of catalyst collected in the bottom of the vessel. Catalyst is drawn downwardly from the bottom of the surge vessel through a short pipe 27 into a vent pot 28, and thence downwardly through the seal leg 29, the seal leg being a substantially elongated conduit of about 60 feet long in most instances. Vent pot 28 permits gas passing upwardly through the seal leg to be withdrawn through a vent pipe 30 to the atmosphere. The use of a vent pot is not absolutely essential since the gas moving upwardly through the seal leg could pass through the surge vessel to exit from the top of the vessel through the conduit 26, and hence in that instance the seal leg 29 could conveniently be attached at its upper end to the bottom of the surge vessel 25. The pressure in the surge vessel 25 is maintained at substantially atmospheric pressure. At the bottom of the seal leg 29 is located a seal pot 31. Below the seal pot is located a short conduit 32 connecting with the top of the reactor 10. Intermediate the seal pot in the top of the reactor is located an emergency shut-off valve 33. This valve is usually of the plug-type and is normally maintained open except in emergencies. When emergency conditions arise which would cause gas to be blown upwardly through the seal leg, the valve 33 can be closed. Steam for sealing purposes is introduced through the conduit 34 into the seal pot in an amount controlled by the valve 35. Sufficient steam is introduced into the seal pot to keep the pressure of the seal pot just slightly above the pressure in the reactor, thereby preventing reactants from flowing up the seal leg. In order to maintain this advanced pressure some steam is continuously flowing upwardly through the seal leg to the vent 30. However, because the seal leg is sufficiently elongated, the catalyst continues to move down smoothly as a compact column through the leg against the upwardly moving seal steam and continues to feed smoothly into the reactor 10.

It has been found that for granular catalyst in TCC systems that the maximum pressure drop that can be tolerated without interruption of the flow of catalyst through the seal leg is equal to the hydrostatic head of catalyst in the column (for TCC catalyst, the loose apparent density in g./cc.$\times 12$, or about 8.7 inches of water per vertical foot). For design purposes, in order to avoid building excessively large conduits, the allowable maximum pressure drop is usually 75–80% of the hydrostatic head, or about 6.8 inches of water per vertical foot of catalyst column. Referring to Figure 2, there is shown a diagram indicating that for a 60 foot leg with hydrated catalyst, this pressure gradient in inches of water per foot could be maintained over the entire length of the seal column whereas, when the catalyst is introduced into the top of the column in a dehydrated state, the allowable maximum pressure gradient of 6.8 inches of water per foot can be maintained only at the bottom of the seal leg and because of continuous hydration this pressure gradient continually falls from bottom to top so that the pressure gradient at the top of the seal leg has been reduced to 2.5 inches of water per foot. Since the pressure gradient has been reduced, the maximum pressure that can be tolerated across the seal leg is limited thereby.

Figure 3 indicates that for a TCC system using a 60 foot seal leg when the catalyst is introduced into the seal leg without being hydrated, approximately 400 pounds per hour of the seal steam is adsorbed by the catalyst while flowing down the leg. However, there is shown there that in the situation where hydration is used in the surge zone at the top of the seal leg a substantially smaller amount of steam, such as about 110 pounds per hour, is adsorbed by the catalyst in the seal leg.

Figure 4 shows an automatic arrangement for supplying steam to the top and bottom of the seal column to provide adequate sealing of the column under variable reactor pressure conditions. The catalyst travels as a compact column from the surge vessel through the conduit 27 and seal leg 29 through the seal pot 31 and short conduit 32 into the reactor 10. The pressure differential is measured at a point 40 in the short conduit 32 and point 42 in the top of the reactor 10, this pressure differential being recorded on a dual pressure controller 43 which is set to maintain a predetermined pressure differential, usually in the neighborhood of 20 inches of water. If, for any reason, reactor pressure is increased during normal operation, the dual pressure controller 43 will effectively open the valve 35 to admit more steam through it, introducing a sufficient amount of steam into the seal pot 31 to insure that the pressure differential between points 40 and 42 is maintained. A second dual pressure controller 44 measures the pressure at points 45 and 46 vertically spaced a short distance apart near the bottom of the seal leg and operates on valve 47 in vent line 48 to prevent the pressure differential between points 45 and 46 from rising above a predetermined maximum. This maximum pressure differential for granular catalyst has previously been indicated at 6.8 inches of water per foot. (75–80 percent of the hydrostatic head of catalyst in the column), that pressure differential which would reduce the catalyst flow and cause a hold up in the seal leg. A third dual pressure controller 49 is connected between a point 50 at the base of the surge vessel 25 and a point 51 in the seal pot and is used to keep this pressure differential between these two points up to a predetermined pressure. This pressure will be set for control purposes just slightly above the pressure in the reactor so that if reactor pressure is increased this control pressure must be set higher an amount sufficient to keep the seal leg pressure above the reaction zone pressure. When this pressure differential tends to fall below the required one for the particular control pressure, the dual pressure controller 49 operates on a valve 52 in line 53 to introduce additional hydration steam into the surge vessel 25. This effectively increases the amount of hydration of the catalyst entering the seal leg and effectively increases the pressure gradient maintained across the catalyst in the upper portion of the seal leg. Sufficient hydration steam is introduced to bring this pressure gradient up sufficiently so that the seal leg is capable of flowing smoothly into the reaction vessel and yet, capable of maintaining between the seal pot and the surge vessel a sufficiently high pressure drop to keep the pressure in the seal pot slightly above the pressure in the reactor. It is seen that the three dual pressure controllers operate effectively together to keep the catalyst flowing through the seal leg with only sufficient hydration steam being used as required to prevent hold up of the catalyst and to permit a maximum pressure drop across the seal leg as required by the particular reactor pressure prevailing.

It is important to operate the TCC system so that the fresh catalyst will be continuously supplied to the reactor to replenish catalyst worn out by cracking the heavy oils to produce additional gasoline supplies. It is further important to provide the feeding against a variable pressure so that, as desired, reactor pressure may at times be increased to a maximum pressure. It has been found that an increase of 1 p.s.i. (gauge) in reactor top pressure will increase charge capacity about 500 barrels of crude per day and that this provides an increased operating profit of about $300,000 a year for a type-75 TCC unit (one nominally capable of handling about 15,000 barrels of crude per calendar day). It is often important, therefore, to operate TCC units at or near the maximum reactor pressure permissible without resort to expensive modification of the catalytic cracking apparatus. It is, of course, necessary to avoid overcontamination of the catalyst with steam since this reduces the catalyst activity and, hence, reduces the amount of gasoline produced. But unless the catalyst is substantially completely hydrated, the problem of nickel contamination arises and, therefore, if the charge stocks contain nickel it is desirable that at least a substantial amount of hydration of the catalyst be completed at least before the catalyst is finally introduced into the reaction vessel. It is seen, therefore, that for maximum efficiency of operation a fairly accurate control of the hydration must be maintained to provide fairly complete hydration without excessive steam contamination and to provide maximum seal leg pressure drop without requiring structural modification of seal leg apparatus or excessively long seal leg construction.

The examples and detailed description of the invention given hereinabove are not intended as a limitation of the invention, but are provided merely for purposes of illustrating the invention in a suitable form and environment. The only limitations intended are those provided in the appended claims.

We claim:

1. In a moving bed hydrocarbon conversion process wherein a granular catalyst is passed as a compact bed through a reaction zone under advanced pressure, a regeneration zone under substantially lower pressure and returned to the top of the reaction zone, the improved method of feeding the catalyst into the top of the reaction zone against the advanced pressure therein, comprising: supplying catalyst continuously from the bottom of the regeneration zone to a surge zone located substantially above the reaction zone to form a compact mass of catalyst in said zone, gravitating catalyst downwardly from the bottom of said surge zone through a substantially elongated passage of restricted cross-section as a compact column, passing catalyst as a compact mass through a seal zone located about the bottom of said elongated column, passing catalyst downwardly as a compact column of restricted cross-section from the bottom of said seal zone into the top of said advanced pressure reaction zone to continuously replace catalyst being withdrawn from the bottom of said zone, continuously measuring the pressure differential between a point intermediate said seal zone and said reaction zone and introducing sufficient steam into said seal zone to maintain the pressure differential at a predetermined value, sufficient to prevent reactant vapors from flowing upwardly from the reaction zone through the gravitating column of catalyst to said seal zone, measuring the pressure differential between two vertically spaced points near the lower end of said seal leg, venting steam from said seal zone in response to said measurement to prevent said pressure differential from rising above a predetermined maximum, below that pressure differential which would cause interruption in the downward gravitational flow of catalyst column, measuring the pressure differential between the surge zone and the seal zone, and introducing hydration steam into said surge zone in response to said pressure differential measurement, the amount being first sufficient to maintain the pressure in said seal zone substantially constant whereby the sealing capacity of the seal leg is increased an amount sufficient to provide adequate seal for the top of the reaction zone without interruption in the downward flow of the catalyst into the reaction zone against the advanced pressure therein.

2. Claim 1 further characterized in that the catalyst is a hydratable granular particle of about 4–12 mesh Tyler screen size and the predetermined maximum pressured differential across the two vertically spaced points near the lower end of the seal leg is 75–80 percent of the hydrostatic head of catalyst in inches of water per foot of catalyst column.

3. Claim 2 further characterized in that the pressure differential between the point intermediate the seal zone and the reaction zone is approximately 15–20 inches of water and the pressure in the reaction zone is maintained between about 18–22 p.s.i.g.

References Cited in the file of this patent

UNITED STATES PATENTS

| | | |
|---|---|---|
| 2,410,309 | Simpson et al. | Oct. 29, 1946 |
| 2,626,235 | Wilson | Jan. 20, 1953 |